Aug. 11, 1936. J. V. MARTIN 2,050,352
AERO AND AUTO TIRE
Filed May 2, 1933 3 Sheets-Sheet 2
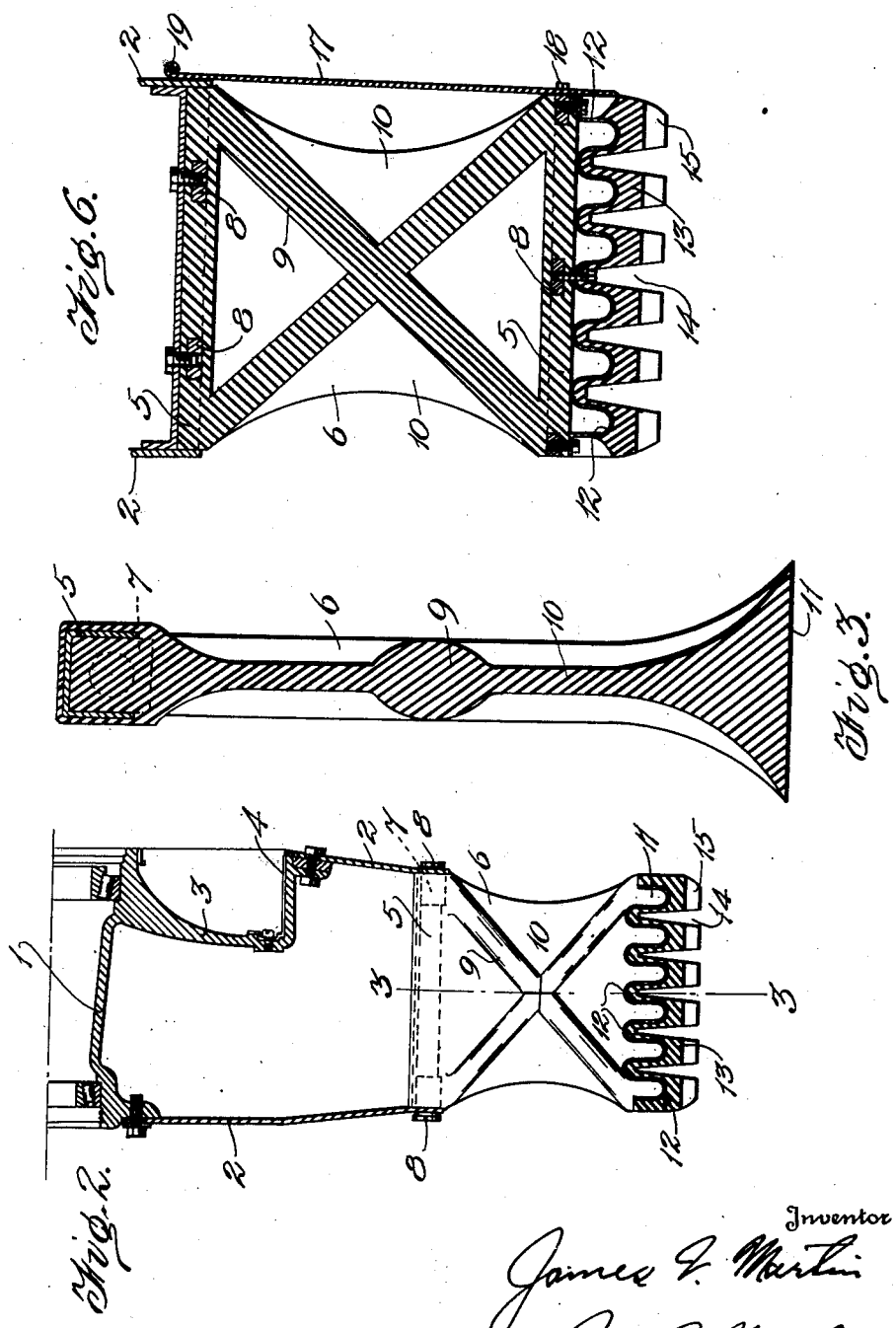

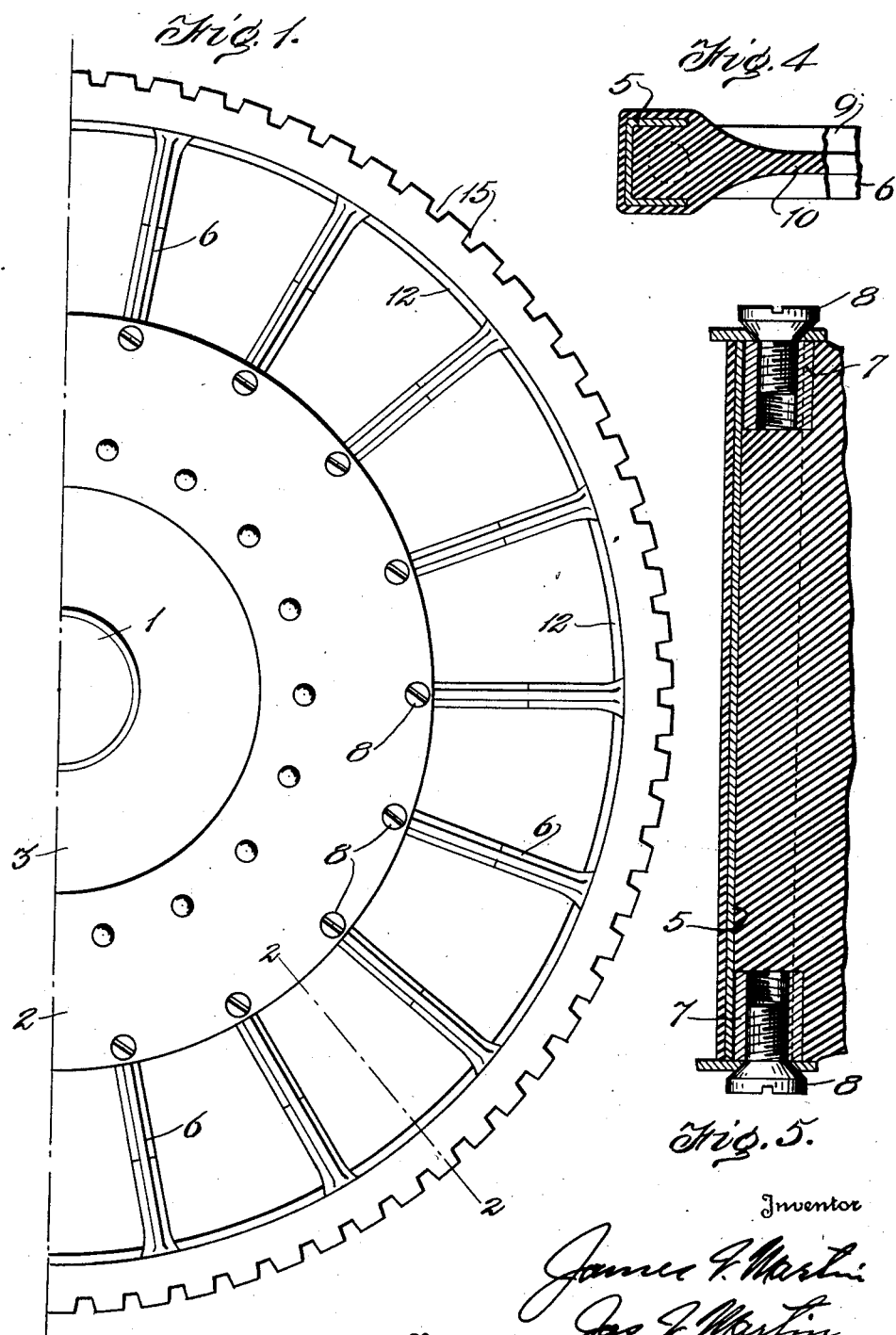

Aug. 11, 1936.  J. V. MARTIN  2,050,352
AERO AND AUTO TIRE
Filed May 2, 1933  3 Sheets-Sheet 3
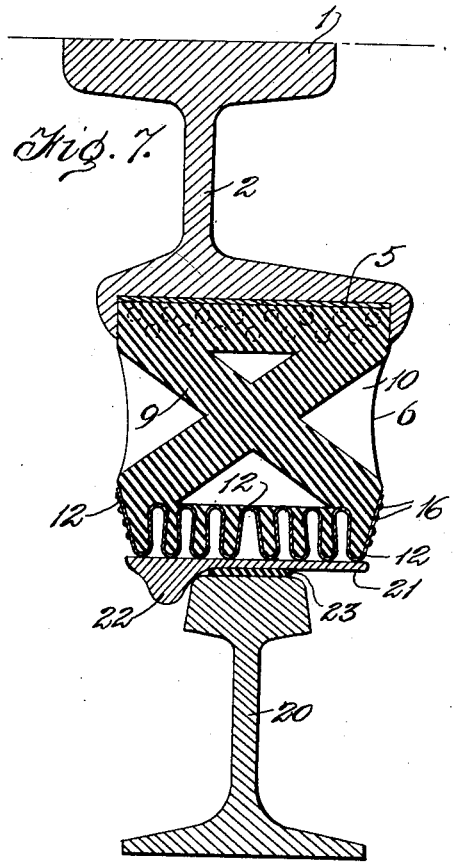
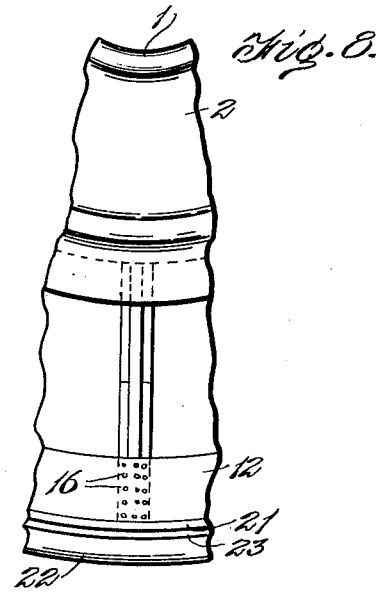
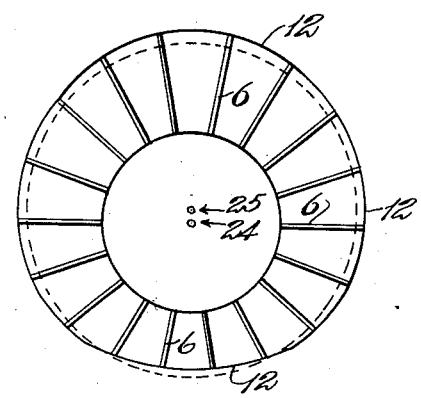
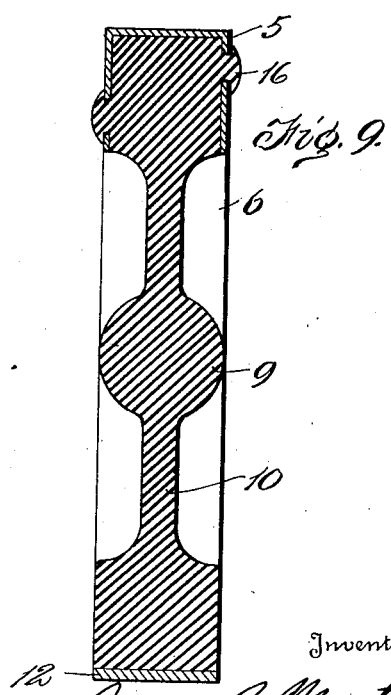

Patented Aug. 11, 1936

2,050,352

UNITED STATES PATENT OFFICE 2,050,352

AERO AND AUTO TIRE

James V. Martin, Garden City, N. Y.

Application May 2, 1933, Serial No. 669,008

20 Claims. (Cl. 152—28)

This invention relates to tires for aeroplanes, automobiles, railroad cars and kindred vehicles and aims to provide a light, strong and durable tire not subject to the dangers from punctures and uneven tire pressures found in pneumatic type tires.

I am aware that, over a period of many years, other inventors have striven to accomplish the above objects and while they have paved the way toward success, they have fallen short due to imperfections of the tire structure which it is the purpose of the present invention to remedy.

One of the difficulties which, in my opinion, has frustrated former efforts to produce a light, durable tire has been the poor disposition of rubber so that at high speeds the heat increment is greater than the radiating area can dissipate: Another difficulty is to be found in a too rigid tread portion. The present invention aims at a happy combination of flexible rim and elastic spokes, adapted by their novel shape and relative positions to each other to co-operate in affording a better curve of shock absorbtion and greater lateral strength than can be found in earlier designs.

The present invention is an improvement on my former disclosures Patent No. 1,954,214 issued April 10, 1934 and Patent No. 2,016,095 issued October 1, 1935.

The other objects of my invention will become apparent as the following construction and arrangement of parts is studied:—

In the drawings:—

Figure 1 illustrates my invention applied to a typical aeroplane or automobile wheel.

Fig. 2 is a view partly in section taken along the line 2—2 of Fig. 1.

Fig. 3 is an enlarged view in cross section through the center of one of the spoke elements, taken on the line 3—3 of Fig. 2.

Fig. 4 is a section showing details of the top of the spoke.

Fig. 5 shows in section the internally disposed brace within the upper part of the spoke.

Fig. 6 shows in section through the center of one of my spoke elements, where a brace is inserted in both the upper and lower part of the spoke.

Fig. 7 shows the railroad adaptation of my invention in cross section, while Fig. 8 shows a view of the side of a railroad wheel and my tire, and Fig. 9 is a cross section of the rubber spoke element at its center.

Fig. 10 is a diagrammatic view of how my invention departs from a true circle under load conditions.

The numeral 1 designates the hub of a vehicle wheel and 2 the typical disc which connects hub and rim. 3 shows a typical wheel compartment adapted for an internally expanding brake and 4 indicates a brake drum. 5 indicates the transverse brace to which the rubber spoke or element 6 is cured at the wheel rim and 7 shows a steel insert in the channel brace for screws 8. 9 indicates the diagonal cross cord or rib of the spoke 6 while 10 indicates the web portion and Figs. 2 and 3 show at 11 the expanded portion of the spokes where they are vulcanized to the corrugated metal rim 12. A rubber tread 13 is cured to the outer side of the flexible steel hoop or rim 12 and each corrugation may be regarded as a hoop or ring as more fully disclosed in my patents above noted. The tread is molded so as to provide antiskid grooves 14 running circumferentially between the tread strips around the tire in the radial plane and grooves 15 running transversely across the strips. The grooves 14 are deeper and the intervening strips 13 are narrower than those shown in my former Patent No. 2,016,095, above noted, and the narrow strips 13 in Figs. 2 and 6 are centrally located relative the wider and stiffer marginal strips: This is the reverse of my former showing and tends to afford firmness to the tread marginal strips while permitting a softer central tread portion. Reference is hereby made to my co-pending divisional application Serial No. 86,872, filed June 23rd, 1936 which deals more specifically with my novel tread configuration and railcar tire. It will be noted that the rubber from the tread is continuous, Fig. 2, around the end of the hoop 12 and unites with the expanded portion of the spokes 6. It is contemplated that holes may be had in the corrugated band in between the rings to increase the bond of the rubber spoke to the tread. Holes 16, for rubber rivets are shown in Figs. 7 and 9. Fig. 6 shows the rubber spoke with screwed attachment means to the wheel and also to the tire rim.

In order to cover up the spokes for aeroplane use a circular disc of elastic material may be used 17, attached to the outer tire portion as by screws 18 and having its center omitted and a wire 19 holding its inner edge.

Figs. 7, 8, and 9 show my invention adapted to rails 20 and the tire rim 12 is welded or otherwise secured to a metal rim 21 having a rail flange 22 and a rubber tread 23.

Fig. 10 illustrates how my tire works under load, 24 being the displaced center of the wheel under load and 25 the center of a true circle indicated by dotted lines. The rim 12 is not rigid enough to support the load delivered to its upper portion by the spokes 6 without deformation; it is designed and proportioned in gauge and depth of corrugations or rings to the load to be carried and also to the number and strength of the elastic spokes to be employed. The spokes are under an initial tension, when the wheel is unloaded, equal to the amount of rim deflection plus the axle departure, so that the spokes at the bottom of the tire under load are neutral as to tension or compression. The other spokes will be under tension, either holding the axle against gravity to the upper rim or holding the lower sides of the rim from bulging too far outwardly. It is contemplated to so proportion the spokes and rim that no failure of chrom-moly steel or other suitable metal will result, or in other words to keep the rim flexing within the elastic limits of the metal employed. No load is to be taken in compression by the spokes, but they are shaped to buckle up at their centers when stressed in compression beyond the static load of the vehicle.

Attention is called to the method I employ to prevent a metal to metal movement between the metal brace 5 and the wheel discs 2; Figs. 2, 4, and 5 show a neat fit for the ends of the braces 5 against the insides of the discs 2 and the tapered neck of the screw 8 within the also tapered hole in the disc 2, see Fig. 5, allow a wedging action between the metal parts to bind them together so that no movement can take place. Thus no friction or noise will be had from chafing of one metal or rubber part on another and only molecular action of the tire parts will impart flexibility and elasticity.

The cross ribs or cords 9 are important to the lateral strength of the tire and the device of multiple hoops with great bonding area and permitting direct bonding between the tire tread and the spokes is also important.

It will be apparent that wide modifications of my invention can be effected without departing from the teachings and I do not limit my invention to the particular adaptations shown and described.

What I claim as new is:—

1. In combination with a vehicle tire an elastic spoke having thickened portions crossing the said spoke diagonally from the lateral margins thereof.

2. In combination with an elastic spoke tire a molded rubber spoke including a web and thickened portions crossing the said web diagonally from the corners of the said spoke.

3. In combination with a vehicle tire and wheel a rim each for both tire and wheel and molded rubber spokes having ribs crossing from the corners thereof and said spokes forming the main connections between the said rims.

4. In combination with a wheel rim a tire including a flexible tread member uniting with rubber spokes to carry the loads from the said rim from its upper half, each of said spokes having thickened portions crossing each other diagonally from their outer corners.

5. In combination with a vehicle wheel, a wheel rim and a flexible tire rim, having a tread cured to the outside thereof, the said tire rim being corrugated circumferentially for stiffness and rubber spokes extending transversely across the inside of the said corrugations and carrying the vehicle weight in tension from the said wheel rim to the upper half of the said tire rim and the lateral margins of each said spoke united with the said tread.

6. A combination according to claim 5 and the said spokes having diagonally crossed ribs from their corner margins.

7. In combination with a tire having a corrugated rim tread portion, elastic spokes connecting the load with the upper part of the said portion and including transversely disposed braces adjacent the said corrugations.

8. In combination with a wheel rim and a tire, a hoop having circumferentially parallel corrugations, elastic spokes connecting the said hoop and rim and transversely disposed braces in the planes of the said spokes and forming part of the said spokes adjacent the said corrugations.

9. A combination according to claim 8 and the said spokes having diagonally crossed ribs from their lateral margins.

10. In combination with a vehicle tire having a flexible rim including corrugations and carrying the vehicle load in tension from its upper portion, a tread vulcanized to the said rim, grooves in the said tread extending within some of the said corrugations and the said tread at intervals extending on the inside of the said rim.

11. In combination with a vehicle wheel and tire, molded rubber spokes carrying the wheel weight in tension to the upper part of the said tire and a corrugated band of hoops flexibly transferring the said weight to the ground, a tread cured to the said hoops on their outside face and each said spoke having ribs crossing each other diagonally from its lateral margins and expanding to approximately double area where attached to the inside for the said hoops.

12. In combination with a vehicle wheel and tire, a tire tread and elastic spokes spacing the said wheel and tread apart, a flexible cover with an open center for the side of the said tire, the outer margins of said cover attached to the said tread and its inner margins overlapping portions of the said wheel and provided with a tension, free floating ring.

13. A wheel and tire combination including molded rubber spokes to carry the wheel loads in tension to the upper half of the said tire, a flexible hoop forming an outer tire rim having a rubber tread portion as the outer periphery of the said tire and each said spoke having thickened diagonal parts crossing each other from the corners thereof.

14. A wheel and tire including a corrugated outer rim for the said tire, molded rubber spokes including internally disposed metal stiffeners to carry the wheel loads in tension to the upper half of the said rim.

15. A vehicle tire and wheel combination including a hoop forming a portion of a tire tread, elastic spokes carrying the wheel weights in tension to the upper half of the said tread, some of the said spokes having ribs crossing diagonally from their lateral upper and lower margins and uniting with the lateral margins of the said tread, the said tread being approximately flat.

16. In combination with a tire which carries its loads through elastic spokes, the elastic spokes being provided with metal stiffeners and thickened portions crossing each other diagonally from the lateral margins of the said stiffeners.

17. A combination according to claim 16 and the said spokes under an initial tension.

18. In combination with a vehicle tire, a wheel and a tire rim spaced apart and held in lateral alignment by elastic spokes, the inner end of each said spoke attached to a metal stiffener, means to clamp said stiffeners to the said wheel and a rubber tread covering the outside of the said tire rim and uniting with the outer ends of the said spokes, the said union affording a continuous tension medium from the said wheel to and around the edges of the said rim.

19. In combination with a vehicle wheel, a wheel hub and a brake drum located within radial planes containing the ends of said hub, elastic spoke elements provided with a metal brace forming a yieldable support for said wheel from the top part of a tire tread portion, the ends of the said braces adapted to form a tapered wedging attachment to the said wheel to prevent frictional movement in the said attachment.

20. In combination with a tire carrying its radial and lateral loads through elastic spokes from the top of a tire tread portion, the said tread portion stiffened by semi-rigid hoops located inwardly of elastic ground contacting material, the outer margins of the said spokes expanding and uniting with said material around the lateral edges of the outermost of the said hoops and the said expanded union kept under distension due to an initial tension of the said spokes.

JAMES V. MARTIN.